(12) United States Patent
Baumann et al.

(10) Patent No.: US 7,855,821 B2
(45) Date of Patent: Dec. 21, 2010

(54) ELECTROCHROMIC COMPOUNDS AND ASSOCIATED MEDIA AND DEVICES

(75) Inventors: Kelvin L. Baumann, Holland, MI (US); Thomas F. Guarr, Holland, MI (US); David A. Theiste, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 284 days.

(21) Appl. No.: 12/229,606

(22) Filed: Aug. 25, 2008

(65) Prior Publication Data

US 2008/0316574 A1 Dec. 25, 2008

Related U.S. Application Data

(63) Continuation-in-part of application No. 11/272,552, filed on Nov. 10, 2005, now Pat. No. 7,428,091.

(60) Provisional application No. 60/627,875, filed on Nov. 15, 2004.

(51) Int. Cl.
*G02F 1/153* (2006.01)
(52) U.S. Cl. ............... 359/273; 359/265; 359/275; 252/582
(58) Field of Classification Search ............ 359/265, 359/273–275; 252/62.2, 500, 582, 583, 586
See application file for complete search history.

(56) References Cited

U.S. PATENT DOCUMENTS

| | | | |
|---|---|---|---|
| 3,772,026 A | 11/1973 | Greenwald | |
| 4,902,108 A | 2/1990 | Byker | |
| 5,202,787 A | 4/1993 | Byker et al. | |
| 5,294,376 A * | 3/1994 | Byker | 252/600 |
| 5,336,448 A * | 8/1994 | Byker | 252/583 |
| 5,818,625 A | 10/1998 | Forgette et al. | |
| 5,928,572 A | 7/1999 | Tonar et al. | |
| 5,940,201 A | 8/1999 | Ash et al. | |
| 5,998,617 A | 12/1999 | Srinivasa et al. | |
| 6,002,511 A | 12/1999 | Varaprasad et al. | |
| 6,020,987 A | 2/2000 | Baumann et al. | |
| 6,064,509 A | 5/2000 | Tonar et al. | |
| 6,137,620 A | 10/2000 | Guarr et al. | |
| 6,188,505 B1 | 2/2001 | Lomprey et al. | |

(Continued)

FOREIGN PATENT DOCUMENTS

EP 1 457 813 A2 9/2004

(Continued)

*Primary Examiner*—Loha Ben
(74) *Attorney, Agent, or Firm*—King & Partners, PLC

(57) ABSTRACT

An electrochromic device having an electrochromic medium which includes a compound represented by the following formula:

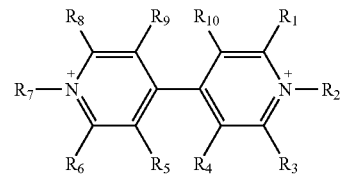

wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s), wherein the carbon atom(s) may be a linking group to, or part of, a halogen, a N, O, and/or S containing moiety, and/or one or more functional groups comprising alcohols, esters, ammonium salts, phosphonium salts, and combinations thereof; with the proviso that $R_2$ and $R_7$ each comprise at least two carbon atoms, at least one of $R_2$ and $R_7$ comprises less than 2 β hydrogen atoms and is void of a benzyl group.

30 Claims, 2 Drawing Sheets

U.S. PATENT DOCUMENTS

| | | |
|---|---|---|
| 6,193,378 B1 | 2/2001 | Tonar et al. |
| 6,193,912 B1 | 2/2001 | Theiste et al. |
| 6,195,192 B1 | 2/2001 | Baumann et al. |
| 6,239,898 B1 | 5/2001 | Byker et al. |
| 6,241,916 B1 | 6/2001 | Claussen et al. |
| 6,249,369 B1 | 6/2001 | Theiste et al. |
| 6,262,832 B1 | 7/2001 | Lomprey et al. |
| 6,388,796 B1 | 5/2002 | Berneth et al. |
| 6,392,783 B1 | 5/2002 | Lomprey et al. |
| 6,399,224 B1 | 6/2002 | Li |
| 6,407,847 B1 | 6/2002 | Poll et al. |
| 6,445,486 B1 | 9/2002 | Lomprey et al. |
| 6,496,294 B2 | 12/2002 | Lomprey et al. |
| 6,569,361 B1 | 5/2003 | Berneth et al. |
| 6,594,066 B2 * | 7/2003 | Lomprey et al. ............ 359/265 |
| 6,597,489 B1 | 7/2003 | Guarr et al. |
| 6,614,578 B2 * | 9/2003 | Giri et al. .................. 359/265 |
| 6,710,906 B2 | 3/2004 | Guarr et al. |
| 6,778,311 B2 | 8/2004 | Roberts et al. |
| 6,783,099 B2 | 8/2004 | Rukavina et al. |
| 6,816,297 B1 | 11/2004 | Tonar et al. |
| 6,842,276 B2 | 1/2005 | Poll et al. |
| 7,428,091 B2 | 9/2008 | Baumann et al. |
| 2002/0015214 A1 | 2/2002 | Nishikitani et al. |
| 2002/0141032 A1 | 10/2002 | Guarr et al. |
| 2003/0072071 A1 | 4/2003 | Asano et al. |
| 2005/0280885 A1 | 12/2005 | Lomprey et al. |
| 2006/0056003 A1 | 3/2006 | Tonar et al. |
| 2006/0103911 A1 | 5/2006 | Baumann et al. |

FOREIGN PATENT DOCUMENTS

| | | |
|---|---|---|
| WO | WO 98/42796 | 10/1998 |
| WO | WO 03/069397 | 8/2003 |

* cited by examiner

ELECTROCHROMIC COMPOUNDS AND ASSOCIATED MEDIA AND DEVICES

CROSS-REFERENCE TO RELATED APPLICATION(S)

This application is a continuation-in-part of U.S. application Ser. No. 11/272,552, filed Nov. 10, 2005, now U.S. Pat. No. 7,428,091, which claims the benefit of U.S. Provisional Application Ser. No. 60/627,875, filed Nov. 15, 2004, which are hereby incorporated herein by reference in their entirety—including all references cited therein.

BACKGROUND OF THE INVENTION

1. Field of the Invention

The present invention relates in general to electrochromic (sometimes referred to herein as "EC") compounds for use in solution phase electrochromic devices and, more particularly, to cathodic electrochromic compounds comprising substituted viologens (i.e. substituted 4,4'-bipyridinium compounds).

2. Background Art

Solution phase electrochromic devices have been known in the art for several years. See, for example, U.S. Pat. No. 4,902,108, entitled "SINGLE-COMPARTMENT, SELF-ERASING, SOLUTION-PHASE ELECTRO-CHROMIC DEVICES, SOLUTIONS FOR USE THEREIN, AND USES THEREOF," which is hereby incorporated herein by reference in its entirety—including the references cited therein. In solution phase electrochromic devices, 4,4'-bipyridinium compounds, such as 1,1'-dioctyl-4,4'-bipyridinium bis(tetrafluoroborate), 1,1'-dibenzyl-2,2,6,6'-tetramethyl-4,4'-bipyridinium bis(tetrafluoroborate), 1,1'-dibenzyl-2,2'-dimethyl-4,4'-bipyridinium bis(tetrafluoroborate) and 1,1'-dibenzyl-4,4'-bipyridinium bis(tetrafluoroborate) are known to be used as cathodic materials. See, for example, U.S. Pat. No. 5,336,448, entitled "ELECTROCHROMIC DEVICES WITH BIPYRIDINIUM SALT SOLUTIONS," which is hereby incorporated herein by reference in its entirety—including the references cited therein. While the utilization of solution phase electrochromic devices which incorporate 4,4'-bipyridinium compounds into their electrochromic mediums has become increasing popular among, for example, the automotive industry, the development of undesirable residual color within the electrochromic medium remains problematic. In fact, 1,1'-dibenzyl-4,4'-bipyridinium bis(tetrafluoroborate) which is void of β hydrogen atoms is known to exhibit poor thermal and/or UV stability.

Indeed, when a sufficient electrical potential difference is applied across the electrodes of a conventional electrochromic device (e.g. an EC window, mirror, aircraft transparency, display device, etcetera), the electrochromic medium becomes intentionally colored (i.e. a low transmission state) inasmuch as one or more of the anodic and the cathodic materials are oxidized and reduced, respectively. Specifically, the anodic materials are oxidized by donating electrons to the anode and the cathodic materials are reduced by accepting electrons from the cathode.

For most commercially available devices, when the electrical potential difference is removed or substantially diminished, the anodic and cathodic materials return to their native or unactivated state and, in turn, return the electrochromic medium to its colorless or nearly colorless state (i.e. a high transmission state). The application and removal of an electrical potential difference is conventionally known as a single cycle of the electrochromic device.

Scientists have observed that over a period of cycles and/or time, during normal operation of the electrochromic device, the electrochromic medium sometimes does not remain colorless in the high transmission state. In some instances, even in the absence of an electrical potential difference, undesirable coloration of the cathodic viologen compound is observed—likely due to an adverse chemical reaction and/or compound degradation.

It is therefore an object of the present invention, among others, to provide a cathodic compound for use in the medium of an electrochromic device that remedies the aforementioned detriments and/or complications associated with maintaining a colorless or nearly colorless electrochromic device while the device is in its high transmission state.

These and other objects of the present invention will become apparent in light of the present specification, claims, and drawings.

SUMMARY OF THE INVENTION

The present invention is directed to an electrochromic device comprising: (a) a first substantially transparent substrate having an electrically conductive material associated therewith; (b) a second substrate having an electrically conductive material associated therewith; and (c) an electrochromic medium comprising: (1) at least one solvent; (2) at least one anodic electroactive material; (3) at least one cathodic electroactive material; (4) wherein at least one of the anodic and cathodic electroactive materials is electrochromic; and (5) wherein at least one cathodic electroactive material is represented by the following formula:

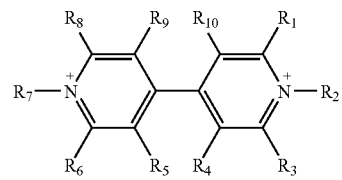

wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s), wherein the carbon atom(s) may be a linking group to, or part of, a halogen, a N, O, and/or S containing moiety, and/or one or more functional groups comprising alcohols, esters, ammonium salts, phosphonium salts, and combinations thereof, with the proviso that $R_2$ and $R_7$ each comprise at least two carbon atoms, at least one of $R_2$ and $R_7$ comprises less than 2 β hydrogen atoms and is void of a benzyl group.

The present invention is also directed to an electrochromic medium for use in an electrochromic device, comprising: (a) at least one solvent; (b) at least one anodic electroactive material; (c) at least one cathodic electroactive material; (d) wherein at least one of the anodic and cathodic electroactive materials is electrochromic; and (e) wherein at least one cathodic electroactive material is represented by the following formula:

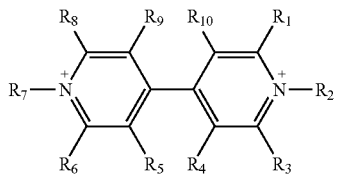

wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s), wherein the carbon atom(s) may be a linking group to, or part of, a halogen, a N, O, and/or S containing moiety, and/or one or more functional groups comprising alcohols, esters, ammonium salts, phosphonium salts, and combinations thereof, with the proviso that $R_2$ and $R_7$ each comprise at least two carbon atoms, at least one of $R_2$ and $R_7$ comprises less than 2 β hydrogen atoms and is void of a benzyl group.

In one embodiment of the present invention one or more of $R_2$ and $R_7$ is void of any β hydrogen atoms.

In another embodiment of the present invention one or more of $R_2$ and $R_7$ comprises an alkyl group containing approximately 5 to approximately 20 carbon atoms (e.g. a 2-ethylhexyl group, a neopentyl group, etcetera).

In yet another embodiment of the present invention one or more of $R_2$ and $R_7$ consists of an alkyl group containing approximately 5 to approximately 20 carbon atoms.

Preferably one or more of $R_2$ and $R_7$ comprises an electron-donating group pending from a β carbon atom. In this embodiment the electron-donating group comprises, for example, a hydroxyl group, a straight or branched alkyl group containing 1 to approximately 50 carbon atom(s), alcohols, amines, phosphines, ethers, esters, amides, nitrites, olefins, and combinations thereof.

In another aspect of the present invention, $R_1$-$R_{10}$ are void of a benzyl group, and more preferably $R_2$ and $R_7$ are void of a benzyl group.

In yet another preferred embodiment of the present invention, the EC medium further comprises at least one of a cross-linked polymer matrix, a free-standing gel, and a substantially non-weeping gel.

In accordance with the present invention, the electrochromic device may comprise an aircraft transparency, a window, a mirror, etcetera, and may include a perimeter metallic ring, as well as a self-cleaning, hydrophilic coating.

These and other features, advantages, and objects of the present invention will be further understood and appreciated by those skilled in the art by reference to the following specification, claims, and appended drawings.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
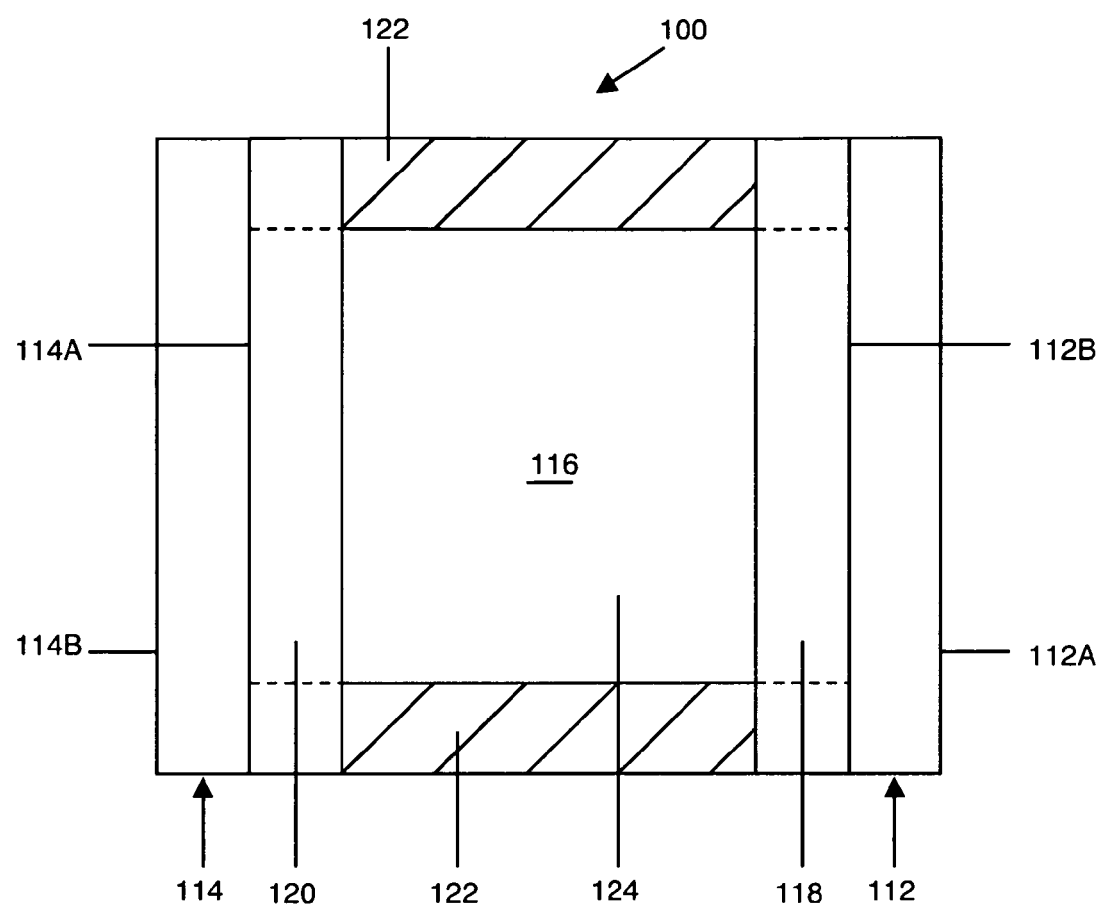
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first transparent substrate 112 having front surface 112A and rear surface 112B, second substrate 114 having front surface 114A and rear surface 114B, which may also be transparent, first transparent electrode (i.e. electrically conductive material) 118 associated with rear, inward-facing surface 112B of first transparent substrate 112, second electrode (i.e. electrically conductive material) 120, which may also be transparent, associated with front, inward-facing surface 114A of second substrate 114, and seal 122 provided between the two layered substrates. Substrates 112 and 114 are preferably maintained in a generally parallel, spaced-apart manner. Seal 122 serves to provide chamber 116 between substrates 112 and 114 in which electrochromic medium 124 is contained in contact with both electrodes 118 and 120.

It will be understood that electrochromic device 100 may comprise, for illustrative purposes only, a window, a mirror, a display device, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625, entitled "ELECTROCHROMIC REARVIEW MIRROR INCORPORATING A THIRD SURFACE METAL REFLECTOR," and U.S. Pat. No. 6,597,489, entitled "ELECTRODE DESIGN FOR ELECTROCHROMIC DEVICES," both of which are hereby incorporated herein by reference in their entirety.

In accordance with the present invention, electrochromic medium 124 preferably comprises at least one solvent, at least one anodic material, and at least one cathodic material. Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

Single layer—the electrochromic medium is a single layer of material, which may include small inhomogeneous regions and includes solution-phase devices where a material is contained in solution in the ionically conducting electrolyte and remains in solution in the electrolyte when electrochemically oxidized or reduced. U.S. Pat. No. 6,193,912, entitled "NEAR INFRARED-ABSORBING ELECTROCHROMIC COMPOUNDS AND DEVICES COMPRISING SAME," U.S. Pat. No. 6,188,505, entitled "COLOR-STABILIZED ELECTROCHROMIC DEVICES," U.S. Pat. No. 6,262,832, entitled "ANODIC ELECTROCHROMIC MATERIALS HAVING A SOLUBILIZING MOIETY," U.S. Pat. No. 6,137,620, entitled "ELECTROCHROMIC MEDIA WITH CONCENTRATION-ENHANCED STABILITY, PRO- CESS FOR PREPARATION THEREOF AND USE IN ELECTROCHROMIC DEVICES," U.S. Pat. No. 6,195,192, entitled "ELECTROCHROMIC MATERIALS WITH ENHANCED ULTRAVIOLET STABILITY," U.S. Pat. No. 6,392,783, entitled "SUBSTITUTED METALLOCENES FOR USE AS ANODIC ELECTROCHROMIC MATERIALS, AND ELECTROCHROMIC MEDIA AND DEVICES COMPRISING THE SAME," and U.S. Pat. No. 6,249,369, entitled "COUPLED ELECTROCHROMIC COMPOUNDS WITH PHOTOSTABLE DICATION OXIDATION STATES" disclose anodic and cathodic materials as well as numerous solvents that may be used in a single layer electrochromic medium, the entire disclosures of which are hereby incorporated herein by reference in their entirety—including the references cited therein. Solution-phase electroactive materials may be contained in the continuous solution phase of a cross-linked polymer matrix in accordance with the teachings of U.S. Pat. No. 5,928,572, entitled "ELECTROCHROMIC LAYER AND DEVICES COMPRISING SAME" or International Patent Application No. PCT/US98/05570, entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are hereby incorporated herein by reference in their entirety—including the references cited therein.

At least three electroactive materials, at least two of which are electrochromic, can be combined to give a pre-selected color as described in U.S. Pat. No. 6,020,987, entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing architectural windows.

The anodic and cathodic materials can be combined or linked by a bridging unit as described in International Patent Application No. PCT/WO97/EP498, entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as is described in International Patent Application No. PCT/WO98/EP3862, entitled "ELECTROCHROMIC POLYMER SYSTEM," U.S. Pat. No. 6,002,511, or International Patent Application No. PCT/US98/05570, entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are hereby incorporated herein by reference in their entirety—including the references cited therein.

Also included is a medium where one or more materials in the medium undergoes a change in phase during the operation of the device, for example, a deposition system where a material contained in solution in the ionically-conducting electrolyte which forms a layer or partial layer on the electrically conducting electrode when electrochemically oxidized or reduced.

Multilayer—the medium is made up in layers and includes at least one material attached directly to an electrically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

It may be desirable to incorporate one or more of a cross-linked polymer matrix, a free-standing gel, and a substantially non-weeping gel into the electrochromic device as is disclosed in U.S. Pat. No. 5,940,201 entitled "ELECTROCHROMIC MIRROR WITH TWO THIN GLASS ELEMENTS AND A GELLED ELECTROCHROMIC MEDIUM," the entire disclosure of which is hereby incorporated herein by reference.

In addition, the electrochromic medium may comprise other materials, such as light absorbers, light (UV) stabilizers, thermal stabilizers, antioxidants, thickeners, viscosity modifiers, tint providing agents, redox buffers also referred to as color-stabilizing additives, and mixtures thereof. Suitable UV-stabilizers may include: the material 2-ethyl-2-cyano-3,3-diphenyl acrylate, sold by BASF of Parsippany, N.Y., under the trademark Uvinul N-35, and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material benzenepropanoic acid, 3-(2H-benzotriazol-2-yl)-5-(1,1-dimethylethyl)-4-hydroxy-, C7-9-branched and linear alkyl esters, sold by Ciba-Geigy Corp., under the trademark Tinuvin 384; the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, a solvent of electrochromic medium 124 may comprise any one of a number of common, commercially available solvents including 3-methylsulfolane, dimethyl sulfoxide, dimethyl formamide, tetraglyme, and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; cyclic carbonates including propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

Transparent substrate 112 may be fabricated from any material that is transparent and has sufficient strength to be able to operate in the environmental conditions to which the device will be exposed. Substrate 112 may comprise any type of borosilicate glass, soda lime glass, float glass, or any one of a number of other materials, such as, for example, MYLAR®, polyvinylidene chloride, polyvinylidene halides, such as polyvinylidene fluoride, a polymer or plastic, such as cyclic olefin copolymers like Topas® available from Ticona, LLC of Summitt, N.J., that is transparent in the visible region of the electromagnetic spectrum. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation, as well as substantial UV radiation, emanating primarily from the sun.

Second substrate 114 will also have sufficient strength and be able to operate in the environmental conditions to which the device will be exposed. For use as an EC window, substrate 114 will also be transparent and preferably made from the same material as substrate 112. If the device is to be used as a mirror or other device that does not require light to pass through the entire device, substrate 114 may comprise a ceramic or metallic material. It will be understood that first and/or second substrates 112 and 114, respectively, can optionally be tempered, heat strengthened, and/or chemically strengthened, prior to or subsequent to being coated with layers of electrically conductive material (118 and 120). First substrate 112 and second substrate 114 are preferably fabricated from a sheet of glass having a thickness ranging from approximately 0.5 millimeters (mm) to approximately 12.7 mm, and more preferably less than approximately 1.0 mm for certain low weight applications.

Additionally, substrates 112 and 114 may be treated or coated as is described in U.S. Pat. No. 6,239,898, entitled "ELECTROCHROMIC STRUCTURES," U.S. Pat. No. 6,193,378, entitled "ELECTROCHROMIC DEVICE HAVING A SELF-CLEANING HYDROPHILIC COATING," and U.S. Pat. No. 6,816,297, entitled "AN ELECTRO-OPTIC DEVICE HAVING A SELF-CLEANING HYDROPHILIC COATING," the entire disclosures of which are hereby incorporated herein by reference in their entirety. Other treatments, such as anti-reflectance coatings, hydrophilic coatings, low-E coatings, and UV-blocking layers are also contemplated for use in accordance with the present invention. It will be understood that such coatings may be associated with substrates 112 and/or 114 in this as well as other embodiments.

Transparent electrode 118 may be made of any material which bonds well to transparent substrate 112, is resistant to corrosion to any materials within the electrochromic device, is resistant to corrosion by the atmosphere, has minimal diffuse or specular reflectance, high light transmission, near neutral coloration, and good electrical conductance. Transparent electrode 118 comprises, for example, fluorine-doped tin oxide, doped zinc oxide, zinc-doped indium oxide, tin-doped indium oxide (ITO), ITO/metal/ITO (IMI) as is disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, or other transparent conductors. Generally, the conductance of transparent electrode 118 will depend on its thickness and composition. IMI generally has superior conductivity compared with the other materials. The thickness of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material may be deposited between transparent electrode 118 and inner surface 112B of substrate 112 to suppress the transmission of any unwanted portions of the electromagnetic spectrum. Electrode 120 may comprise many of the same properties as transparent electrode 118, and can be fabricated from the same materials; however, if electrode 120 is not required to be transparent it may be made of metals such as silver, gold, platinum, and alloys thereof.

In the particular embodiment shown in FIG. 1, seal 122 may be any material that is capable of adhesively bonding to the inner surfaces of elements 112 and 114 and/or electrodes 118 and 120, to seal the perimeter, such that electrochromic medium 124 does not leak from the chamber defined between the transparent substrates. The seal preferably has good adhesion to glass, metals, metal oxides, and other substrate materials; preferably has low permeabilities for oxygen, moisture vapor, and other detrimental vapors and gasses; and must not interact with or poison the electrochromic material it is meant to contain and protect. The seal may be applied in any conventional manner. A preferred seal material and method for applying the seal as well as a preferred method of constructing electrochromic device 100 are described further below.

Electrochromic device 100 further includes a means of providing electrical contact to the electrochromic medium, such as bus clips (not shown) that can be clipped about the perimeter of first and second elements 112 and 114 in such a manner as to physically and electrically contact electrodes 118 and 120 as is disclosed in U.S. Pat. No. 6,407,847, entitled "ELECTROCHROMIC MEDIUM HAVING A COLOR STABILITY," which is hereby incorporated herein by reference in its entirety. Bus clips thus enable electrical current to flow between an external driving circuit through first and second electrodes 118 and 120 and electrochromic medium 124 contained in chamber 116 therebetween. In this manner, the light transmittance of electrochromic device 100 may be varied in response to the electrical control of an external drive circuit. It will be understood that bus clips may be made of any known construction and/or known materials. One possible construction for bus clips is disclosed in U.S. Pat. No. 6,064,509, entitled "CLIP FOR USE WITH TRANSPARENT CONDUCTIVE ELECTRODES IN ELECTROCHROMIC DEVICES," the disclosure of which is hereby incorporated herein by reference in its entirety. Additionally, electrical contact may be provided by conventional conductive inks, metal foils, and the like, such as are used in electrochromic mirrors with a metallic ring that is visible around the perimeter of the mirror as is disclosed in U.S. Application Ser. No. 60/614,150, entitled "VEHICULAR REARVIEW MIRROR ELEMENTS AND ASSEMBLIES INCORPORATING THESE ELEMENTS," which is hereby incorporated herein by reference in its entirety.

Referring once again to EC medium 124, anodic materials suitable for use in accordance with the present invention may include any one of a number of materials including ferrocene, substituted ferrocenes, substituted ferrocenyl salts, substituted phenazines, phenothiazine, substituted phenothiazines, thianthrene, and substituted thianthrenes. Examples of anodic materials may include di-tert-butyl-diethylferrocene, 5,10-dimethyl-5,10-dihydrophenazine, 3,7,10-trimethylphenothiazine, 2,3,7,8-tetramethoxythianthrene, and 10-methylphenothiazine. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108, entitled "SINGLE-COMPARTMENT, SELF-ERASING, SOLUTION-PHASE ELECTROCHROMIC DEVICES, SOLUTIONS FOR USE THEREIN, AND USES THEREOF," as well as U.S. Pat. No. 6,188,505, entitled "COLOR-STABILIZED ELECTROCHROMIC DEVICES," both of which are incorporated herein by reference in their entirety.

As was briefly discussed supra, the present invention is directed to cathodic compounds, including substituted 4,4'-bipyridinium compounds and associated derivatives thereof which are useful in solution phase EC devices due to, among other things, their enhanced thermal stability. Indeed, as will be shown experimentally below, it has been surprisingly discovered that the reduction of β hydrogen atoms and/or the omission of one or more benzyl groups enhances the stability of EC devices which utilize these compounds as the cathodic components.

In accordance with the present invention, suitable cathodic compounds include those represented by the following formula:

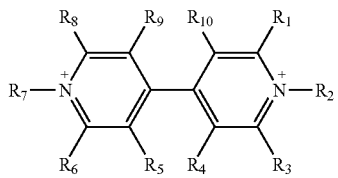

wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s), wherein the carbon atom(s) may be a linking group to, or part of, a halogen, a N, O, and/or S containing moiety, and/or one or more functional groups comprising alcohols, esters, ammonium salts, phosphonium salts, and combinations thereof; with the proviso that $R_2$ and $R_7$ each comprise at least two carbon atoms, at least one of $R_2$ and $R_7$ comprises less than 2 β hydrogen atoms and is void of a benzyl group.

In one embodiment of the present invention, one or both of $R_2$ and $R_7$ is void of any β hydrogen atoms. Examples of such compounds include, but are not limited to 1,1'-di(neopentyl)-4,4'-dipyridinium bis(tetrafluoroborate), and 1,1'-di(1-adamantane methyl)-4,4'-dipyridinium bis(tetrafluoroborate).

In another aspect of the present invention, one or both of $R_2$ and $R_7$ comprises less than 2 β hydrogen atoms and is void of a benzyl group and consists and/or comprises an alkyl group containing approximately 5 to approximately 20 carbon atoms. An example of such a compound includes, but is not limited to 1,1'-di[2-(ethyl)hexyl]-4,4'-dipyridinium bis(tetrafluoroborate).

Preferably, one or both of $R_2$ and $R_7$ comprises an electron-donating group pending from a β carbon atom. Examples of electron-donating groups include, but are not limited to, a hydroxyl group, a straight or branched alkyl group containing 1 to approximately 50 carbon atom(s), alcohols, amines, phosphines, ethers, esters, amides, nitrites, olefins, and combinations thereof.

Although not shown, it will be understood that the bipyridinium compounds disclosed herein comprise ionic constituents which are associated with balancing counter ions such as anions including halides, trifluoromethanesulfonate, bis(trifluoromethane)sulfon-amide, tetrafluoroborate, tetraphenylborate, hexafluorophosphate, or other similar anions.

It will be further understood that while 4,4'-dipyridinium viologens have been disclosed as suitable base cathodic compounds, other compounds that would be known to those having ordinary skill in the art are likewise contemplated for use in accordance with the present invention, including, but not limited to, phenanthrolinium compounds, such as N,N'-di(3-(triphenylphosphonium)propyl)-3,8-phenanthrolinium tetrakis (tetrafluoroborate) and derivative thereof, diimidium such as N,N'-di(5-(triphenylphosphonium)pentyl)-1,4,5,8 naphthalenetetracarboxylic diimidium bis(tetrafluoroborate) and derivatives thereof, which are disclosed in U.S. Pat. No. 6,262,832, entitled "ANODIC ELECTROCHROMIC MATERIALS HAVING A SOLUBILIZING MOIETY," and U.S. Pat. No. 6,445,486, entitled "ELECTROACTIVE MATERIALS AND BENEFICIAL AGENTS HAVING A SOLUBILIZING MOIETY," and/or a diffusion coefficient controlling moiety as is taught in U.S. Pat. No. 6,710,906, entitled "CONTROLLED DIFFUSION COEFFICIENT ELECTROCHROMIC MATERIALS FOR USE IN ELECTROCHROMIC MEDIUMS AND ASSOCIATED ELECTROCHROMIC DEVICES," all of which are hereby incorporated herein by reference in their entirety—including the references cited therein.

Electrochromic devices having as a component part an electrochromic medium as defined herein can be used in a wide variety of applications wherein the transmitted or reflected light can be modulated. Such devices include rearview mirrors for vehicles; windows for the exterior of a building, home, or vehicle including aircraft transparencies; skylights for buildings including tubular light filters; windows in office or room partitions; display devices; aerospace windows; contrast enhancement filters for displays; and light filters for photographic devices and light sensors—just to name a few.

It will be understood that, unless otherwise specified, the chemical reagents provided herein below, or their precursors, are available from common commercial chemical vendors, such as Aldrich Chemical Co., of Milwaukee, Wis.

The invention is further described by the following examples.

EXAMPLE 1

Synthesis of 1,1'-di[2-(ethyl)hexyl]-4,4'-dipyridinium bis(tetrafluoroborate)

A two liter three-neck round-bottom flask fitted with a reflux condenser, mechanical stirrer, and heating mantle was charged with 386 grams (g) of 2-(ethyl)hexyl bromide, 78 g of 4,4'-dipyridal and 1.0 liter (L) of acetonitrile. While being agitated under positive nitrogen pressure, the reaction slurry was heated to reflux. After 144 hours (h) the reaction was cooled to room temperature, and the resulting 1,1'-di[2-(ethyl)hexyl]-4,4'-dipyridinium dibromide salt was obtained via vacuum filtration. The dibromide salt wet cake was first washed with 500 milliliters (ml) of acetonitrile, and subsequently washed with 500 ml of acetone.

Next, the resulting yellow filter cake was air-dried and yielded 93.1% of the dibromide salt. The dibromide salt was added back to the 2 L reaction flask, along with 200 ml of acetone, 500 ml of deionized water, and 500 ml of 40% sodium tetrafluoroborate aqueous solution. The resulting mixture was heated to reflux to dissolve, then was cooled over 16 h as the bis(tetrafluoroborate) salt formed and precipitated. The bis(tetrafluoroborate) salt was collected via vacuum filtration and washed with 500 ml of deionized water and then recrystallized from an acetone and water mixture to yield 1,1'-di[2-(ethyl)hexyl]-4,4'-dipyridinium bis(tetrafluoroborate), which was dried in a vacuum oven set at 70 Centigrade (C) for 8 h.

EXAMPLE 2

Synthesis of 1,1'-di(neopentyl)-4,4'-dipyridinium bis(tetrafluoroborate)

1,1'-di(neopentyl)-4,4'-dipyridinium bis(tetrafluoroborate) is prepared by refluxing a solution of acetonitrile, containing 4,4' dipyridal and 2,4-dinitro-chlorobenzene and then reacting the 1,1'-di(2,4-dinitrophenyl)-4,4-dipyridinium dichloride salt with neopentylamine.

A 500 ml three-neck round-bottom flask is charged with 15.6 g (100 mmole) of 4,4' dipyridal, 81.0 g (400 mmole) of 2,4 dinitro-chlorobenzene and 250 ml of acetonitrile. The resulting solution is heated to reflux for 72 h and the reaction mixture is cooled to room temperature. The reaction product, 1,1-di(2,4-dinitrophenyl)-4,4'-dipyridinium dichloride is filtered off and washed with 100 ml of acetonitrile followed by 100 ml of acetone, and is then allowed to air-dry.

Next a 500 ml three-neck round-bottom flask is charged 100 ml of water, 100 ml of N,N'dimethylformamide (DMF) and 26.1 g (300 mmole) of neopentyl amine. The solution is heated to reflux. In a separate flask, the 1,1'di(2,4-dinitrophenyl)-4,4'-dipyridinium dichloride salt is dissolved into 200 ml of hot water. This solution is added dropwise, over 20 minutes, to the neopentyl amine aqueous solution and then refluxed for an additional 3 h.

The resulting slurry is cooled to room temperature and the by-product, 2,4-dinitroaniline is filtered off. The resulting solution is concentrated to a total volume of 100 ml, and then 500 ml of acetone is added over several h. The 1,1'-di(neopentyl)-4,4'-dipyridinium dichloride salt is allowed to precipitate over 1 h and is then filtered off. The product is recrystallized from a mixture of 50 ml water and 50 ml of ethanol. It is allowed to crystallize overnight at room temperature.

The dipyridinium dichloride salt is filtered off and then dissolved into 300 ml of hot water, to which 300 ml of a 1 M aqueous solution of sodium tetrafluoroborate is added. The hot solution is cooled at 5 C for 2 h. The resulting 1,1'-di (neopentyl)-4,4'-dipyridinium bis(tetrafluoroborate) salt is then filtered off and recrystallized in 200 ml of acetonitrile and 20 ml of water to purify.

EXAMPLE 3

Synthesis of 1,1'-di(1-adamantane methyl)-4,4'-dipyridinium bis(tetrafluoroborate)

1,1'-di(adamantly methyl)-4,4'-dipyridinium-bis(tetrafluoroborate) is prepared in a similar manner to 1,1'-di (neopentyl)-4,4'-dipyridinium bis(tetrafluoroborate) as described herein above, except that adamantly methyl amine is utilized instead of the neopentyl amine.

In an attempt to eliminate any ambiguity associated with the nomenclature of the compounds identified herein, structures of the same are provided herein below with alpha (α) and beta (β) designations:

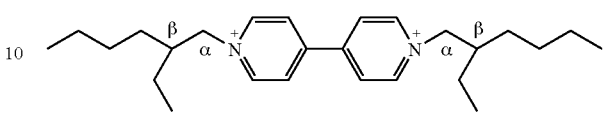

1,1'-di[2-(ethyl)hexyl]-4,4'-dipyridinium bis(tetrafluoroborate)

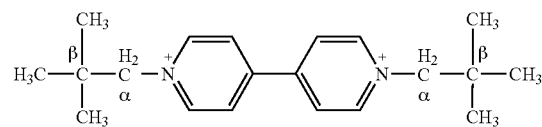

1,1'-di(neopentyl)-4,4'-dipyridinium bis(tetrafluoroborate)

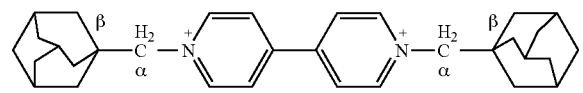

1,1'-di(1-adamantane methyl)-4,4'-dipyridinium bis(tetrafluoroborate)

In support of the present invention, thermal experimentation was conducted wherein electrochromic devices were prepared which comprised prior art 1,1'-dioctyl-4,4'-bipyridinium bis(tetrafluoroborate) as the cathodic electrochromic material, the color-stabilized performance of which were compared to analogous devices that comprised 1,1'-di[2-(ethyl)hexyl]-4,4'-dipyridinium bis(tetrafluoroborate) as the cathodic electrochromic material—which has less than 2 β hydrogen atoms and is void of a benzyl group.

In discussing colors it is useful to refer to the Commission Internationale de l'Eclairage's (CIE) 1976 CIELAB Chromaticity Diagram (commonly referred to as the L*a*b* chart). The technology of color is relatively complex, but a fairly comprehensive discussion is given by F. W. Billmeyer and M. Saltzman in the Principles of Color Technology, $2^{nd}$ Ed., J. Wiley and Sons Inc. (1981), and the present disclosure, as it relates to color technology and terminology, generally follows that discussion. On the L*a*b* chart, L* defines lightness, a* denotes the red/green value, and b* denotes the yellow/blue value. Each of the electrochromic media has an absorption spectra at each particular voltage that may be converted into a three number designation, their L*a*b* values. For the present discussion, the a*, b*, ΔE, and ΔY values are relevant inasmuch as: (1) a medium with an increased a* value is more red; (2) a medium with a decreased a* value is more green; (3) a medium with an increased b* value is more yellow; (4) a medium with a decreased b* value is more blue;

(5) a medium with an increased ΔE value has a greater overall color change; and (6) a medium with an increased ΔY value has a great overall change in lightness and/or intensity.

The Δa*, Δb*, ΔE, and ΔY values are calculated by importing L*a*b* values into the following formulae:

$$\Delta a^* = (a_t^* - a_0^*)$$

wherein:
Subscript "0" is an initial value; and
Subscript "t" is a value after a given amount of time $$\Delta b^* = (b_t^* - b_0^*)$$

wherein:
Subscript "0" is an initial value; and
Subscript "t" is a value after a given amount of time $$\Delta E = SQRT((L_t^* - L_0^*)^2 + (a_t^* - a_0^*)^2 + (b_t^* - b_0^*)^2)$$

wherein:
SQRT is the square root operation;
Subscript "0" is an initial value (for L*, a*, and b*); and
Subscript "t" is a value after a given amount of time (for L*, a*, and b*)

$$\Delta Y = 100 \times (((L_t^* + 16)/116)^3 - ((L_0^* + 16)/116)^3)$$

wherein:
Subscript "0" is an initial value; and
Subscript "t" is a value after a given amount of time.

Experiment No. 1

In this experiment two electrochromic media were prepared by mixing the following materials together in the concentrations provided below:

| Component | Material | Concentration |
|---|---|---|
| Experiment No. 1A | | |
| Cathodic | 1,1'-dioctyl-4,4'-bipyridinium bis(tetrafluoroborate) | 10.0 mM |
| Anodic | None | — |
| Additive | None | — |
| Solvent | Propylene Carbonate (PC) | N/A |
| Experiment No. 1B | | |
| Cathodic | 1,1'-di[2-(ethyl)hexyl]-4,4'-dipyridinium bis(tetrafluoroborate) | 10.0 mM |
| Anodic | None | — |
| Additive | None | — |
| Solvent | Propylene Carbonate (PC) | N/A |

Each of the media were associated with an electrochromic device for testing. Specifically, the device comprised two 2×5 inch substrates. The first substrate was coated with generally clear, conductive tin-doped indium oxide, and the second substrate was coated with tin-doped indium oxide as well. The substrates were spaced 250 microns apart for accommodating the medium.

As can be seen, Experiment No. 1A includes a prior art cathodic compound and Experiment No. 1B includes a cathodic compound of the present invention which has less than 2 β hydrogen atoms and is void of a benzyl group. In order to simulate a harsh thermal environment, each of the above-prepared media were placed into a conventional oven having a temperature set point of 105 degrees centigrade. The media were then evaluated for their color stability by obtaining L*a*b* values at predetermined intervals. The L*a*b* data for Experiment Nos. 1A and 1B are provided below.

| Experiment No. 1 - Thermal | | | | | | | | | | | |
|---|---|---|---|---|---|---|---|---|---|---|---|
| Experiment 1A | | | | | | Experiment 1B | | | | | |
| Hours | L* | a* | b* | Y | ΔE | Hours | L* | a* | b* | Y | ΔE |
| 0 | 83.42 | −2.19 | 1.04 | 62.96 | 0.00 | 0 | 84.82 | −2.21 | 1.25 | 65.65 | 0.00 |
| 163 | 81.41 | −3.82 | −2.69 | 59.22 | 4.54 | 187 | 82.33 | −3.35 | −0.57 | 60.91 | 3.29 |
| 325 | 80.19 | −4.16 | −3.95 | 57.02 | 6.26 | 324 | 81.76 | −3.76 | −1.47 | 59.86 | 4.38 |
| 537 | 79.12 | −4.67 | −5.54 | 55.14 | 8.24 | 487 | 79.42 | −4.07 | −2.36 | 55.66 | 6.76 |
| 673 | 78.17 | −4.88 | −6.21 | 53.50 | 9.35 | 650 | 81.32 | −4.78 | −3.43 | 59.05 | 6.38 |
| 980 | 77.02 | −3.99 | −8.83 | 51.57 | 11.90 | 814 | 80.75 | −4.97 | −4.05 | 58.02 | 7.23 |
| 1147 | 76.83 | −5.66 | −8.72 | 51.25 | 12.28 | 977 | 79.90 | −5.32 | −4.75 | 56.50 | 8.36 |
| 1312 | 75.49 | −5.78 | −9.02 | 49.06 | 13.30 | 1116 | 79.63 | −5.63 | −5.45 | 56.03 | 9.14 |
| 1499 | 72.81 | −5.77 | −9.63 | 44.88 | 15.47 | 1280 | 78.95 | −5.65 | −5.52 | 54.84 | 9.60 |
| 1636 | 74.20 | −6.22 | −10.49 | 47.02 | 15.30 | 1467 | 78.22 | −5.98 | −6.23 | 53.59 | 10.66 |
| 1799 | 73.54 | −6.23 | −10.87 | 45.99 | 15.99 | 1630 | 77.59 | −6.22 | −6.69 | 52.52 | 11.46 |
| 1962 | 73.72 | −6.84 | −12.51 | 46.27 | 17.30 | 1772 | 75.58 | −6.19 | −6.90 | 49.21 | 12.95 |
| 2126 | 73.05 | −6.75 | −12.68 | 45.24 | 17.79 | 1962 | 77.81 | −6.58 | −7.74 | 52.89 | 12.21 |
| 2289 | 72.70 | −6.93 | −13.65 | 44.71 | 18.79 | 2105 | 77.02 | −6.66 | −7.99 | 51.57 | 12.88 |
| 2428 | 72.16 | −7.10 | −14.35 | 43.90 | 19.69 | 2266 | 76.46 | −6.93 | −8.56 | 50.64 | 13.73 |
| 2592 | 72.00 | −6.93 | −14.34 | 43.66 | 19.73 | 2431 | 76.91 | −7.13 | −8.97 | 51.38 | 13.83 |
| 2779 | 71.60 | −7.07 | −14.58 | 43.07 | 20.19 | 2596 | 75.94 | −7.27 | −9.11 | 49.79 | 14.55 |
| 2899 | 71.25 | −7.01 | −15.26 | 42.55 | 20.91 | 2762 | 75.63 | −7.47 | −9.82 | 49.29 | 15.32 |
| 3060 | 70.87 | −7.07 | −15.75 | 42.00 | 21.52 | 2928 | 77.09 | −8.02 | −11.07 | 51.68 | 15.66 |
| 3225 | 71.26 | −7.25 | −16.18 | 42.57 | 21.68 | 3096 | 75.74 | −8.10 | −11.31 | 49.47 | 16.58 |
| 3390 | 69.99 | −7.24 | −16.31 | 40.74 | 22.51 | 3263 | 74.90 | −8.08 | −11.52 | 48.12 | 17.20 |
| 3556 | 69.51 | −7.34 | −16.94 | 40.06 | 23.31 | 3405 | 75.73 | −8.26 | −11.22 | 49.45 | 16.58 |
| 3722 | 70.69 | −7.80 | −18.38 | 41.74 | 23.89 | 3573 | 74.97 | −8.35 | −11.64 | 48.23 | 17.35 |
| 3890 | 68.76 | −7.64 | −18.53 | 39.01 | 25.05 | 3739 | 74.27 | −8.35 | −11.52 | 47.13 | 17.67 |
| 4057 | 68.90 | −7.71 | −18.91 | 39.21 | 25.28 | 3901 | 74.18 | −8.53 | −12.14 | 46.98 | 18.23 |
| 4224 | 67.43 | −7.40 | −18.68 | 37.20 | 25.92 | 4087 | 73.92 | −8.66 | −12.70 | 46.58 | 18.84 |
| 4371 | 66.88 | −7.51 | −19.15 | 36.47 | 26.64 | 4254 | 71.93 | −9.00 | −13.67 | 43.55 | 20.85 |
| 4536 | 67.42 | −7.25 | −18.85 | 37.19 | 26.02 | 4401 | 71.71 | −9.08 | −13.79 | 43.23 | 21.10 |
| 4697 | 67.63 | −7.50 | −20.02 | 37.47 | 26.85 | 4566 | 72.37 | −9.01 | −13.76 | 44.21 | 20.65 |

-continued

Experiment No. 1 - Thermal

| Experiment 1A | | | | | | Experiment 1B | | | | | |
|---|---|---|---|---|---|---|---|---|---|---|---|
| Hours | L* | a* | b* | Y | ΔE | Hours | L* | a* | b* | Y | ΔE |
| 4883 | 66.31 | −7.33 | −20.24 | 35.73 | 27.79 | 4727 | 73.05 | −9.40 | −14.67 | 45.24 | 21.06 |
| 5023 | 65.95 | −7.33 | −20.37 | 35.26 | 28.11 | 4913 | 71.83 | −9.27 | −14.71 | 43.38 | 21.77 |
| 5184 | 66.27 | −7.34 | −20.90 | 35.67 | 28.32 | 5053 | 71.44 | −9.34 | −14.83 | 42.83 | 22.10 |
| 5347 | 64.62 | −7.06 | −21.20 | 33.57 | 29.53 | 5214 | 71.91 | −9.48 | −15.30 | 43.53 | 22.21 |
| 5509 | 64.78 | −6.99 | −21.15 | 33.77 | 29.37 | 5377 | 71.10 | −9.40 | −15.34 | 42.33 | 22.70 |
| 5670 | 64.32 | −6.84 | −21.50 | 33.20 | 29.91 | 5539 | 70.86 | −9.36 | −15.36 | 41.98 | 22.85 |
| 5832 | 63.95 | −6.88 | −21.92 | 32.74 | 30.47 | 5700 | 70.09 | −9.39 | −15.86 | 40.88 | 23.69 |
| 5994 | 64.20 | −6.56 | −22.03 | 33.05 | 30.34 | 5862 | 70.14 | −9.60 | −16.20 | 40.95 | 23.97 |
| 6155 | 63.99 | −6.57 | −22.36 | 32.79 | 30.73 | 6024 | 70.71 | −9.19 | −15.86 | 41.77 | 23.25 |
| 6317 | 63.70 | −6.41 | −22.75 | 32.43 | 31.19 | 6185 | 70.34 | −9.48 | −16.38 | 41.23 | 23.94 |
| 6477 | 65.31 | −6.72 | −23.38 | 34.44 | 30.74 | 6347 | 70.34 | −9.35 | −16.49 | 41.23 | 23.99 |
| 6639 | 64.64 | −6.69 | −23.27 | 33.60 | 31.05 | 6507 | 71.94 | −9.96 | −17.39 | 43.57 | 23.95 |
| 6800 | 64.33 | −6.67 | −23.49 | 33.21 | 31.40 | 6669 | 71.48 | −9.95 | −17.12 | 42.89 | 23.99 |
| 6929 | 63.92 | −6.51 | −23.79 | 32.70 | 31.87 | 6830 | 71.41 | −10.11 | −17.18 | 42.79 | 24.12 |
| 7090 | 63.55 | −6.23 | −23.91 | 32.25 | 32.15 | 6959 | 71.11 | −10.13 | −17.47 | 42.35 | 24.52 |
| 7278 | 63.23 | −6.18 | −24.08 | 31.86 | 32.47 | 7120 | 70.84 | −10.02 | −17.57 | 41.96 | 24.71 |
| 7416 | 63.09 | −6.11 | −24.20 | 31.70 | 32.65 | 7308 | 70.65 | −10.13 | −17.70 | 41.68 | 24.95 |
| 7577 | 63.16 | −6.15 | −24.36 | 31.78 | 32.73 | 7446 | 70.69 | −10.12 | −17.76 | 41.74 | 24.97 |
| 7909 | 62.55 | −5.95 | −24.72 | 31.05 | 33.37 | 7607 | 70.76 | −10.39 | −18.11 | 41.84 | 25.29 |
| 8070 | 62.15 | −5.77 | −24.58 | 30.58 | 33.49 | 7939 | 70.48 | −10.44 | −18.30 | 41.44 | 25.60 |
| 8230 | 62.01 | −5.69 | −24.75 | 30.41 | 33.70 | 8100 | 69.98 | −10.35 | −18.19 | 40.72 | 25.78 |
| 8395 | 61.66 | −5.53 | −25.06 | 30.01 | 34.14 | 8260 | 69.94 | −10.47 | −18.55 | 40.66 | 26.11 |
| 8725 | 60.96 | −5.32 | −25.40 | 29.20 | 34.83 | 8425 | 69.77 | −10.48 | −18.76 | 40.42 | 26.37 |
| 8887 | 60.49 | −5.15 | −25.78 | 28.67 | 35.41 | 8755 | 69.55 | −10.55 | −18.85 | 40.11 | 26.58 |
| 9049 | 60.81 | −4.91 | −25.87 | 29.03 | 35.25 | 8917 | 69.19 | −10.61 | −19.21 | 39.61 | 27.08 |
| 9209 | 60.80 | −4.77 | −26.05 | 29.02 | 35.39 | 9079 | 69.63 | −10.61 | −19.17 | 40.23 | 26.80 |
| 9371 | 60.40 | −4.74 | −26.06 | 28.57 | 35.65 | 9239 | 69.66 | −10.72 | −19.55 | 40.27 | 27.11 |
| 9699 | 60.39 | −4.50 | −26.09 | 28.56 | 35.66 | 9401 | 69.36 | −10.76 | −19.44 | 39.85 | 27.21 |
| 9860 | 59.76 | −4.52 | −26.26 | 27.86 | 36.20 | 9729 | 69.38 | −10.78 | −19.73 | 39.87 | 27.42 |
| 10022 | 59.65 | −4.37 | −26.31 | 27.74 | 36.30 | 9890 | 68.86 | −10.86 | −19.95 | 39.15 | 27.91 |

Figure 2:
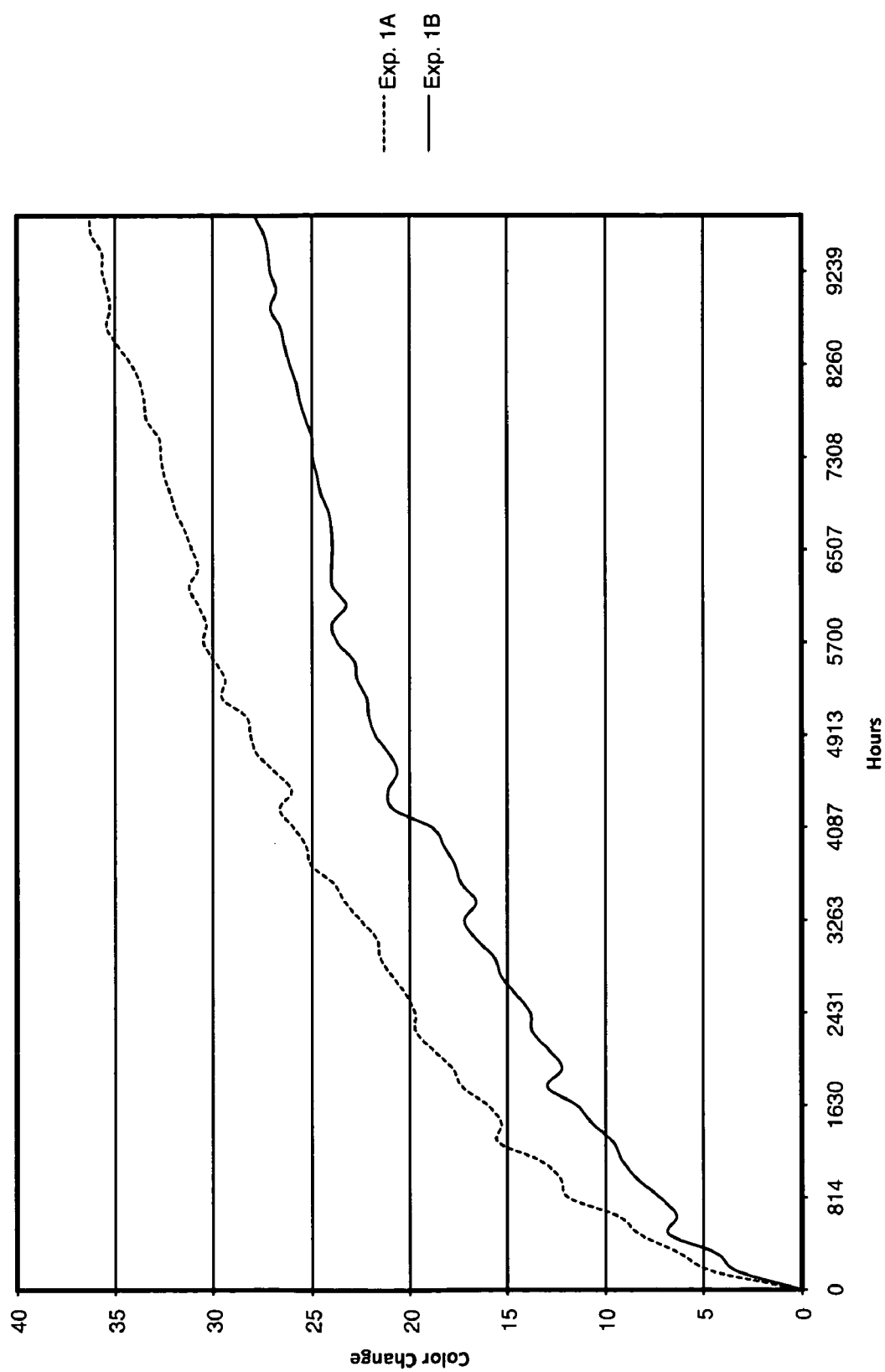
FIG. 2 of the drawings is a two-dimensional plot showing color change (ΔE) as a function of exposure time to elevated temperatures for Experiments 1A-1B.

As can be seen from the data supra, the medium comprising the prior art cathodic compound (1A) turned substantially more blue than the cathodic compound of the present invention (1B), as is evident by the increasingly negative b* value. The substantial difference in overall color change is best seen in FIG. 2 by the large ΔE value of experiment 1A relative to experiment 1B.

Without being bound to any one particular theory, it is believed that cathodic compounds of the present invention which comprise less than 2 β hydrogen atoms and are void of a benzyl group enhance thermal stability via one or more contributing factors, including: (1) reducing the likelihood of a Hoffman elimination reaction which appears to result in degradation of cathodic compounds (see below); (2) increasing steric hindrance around the β carbon atom, especially relative to a β hydrogen atom; and (3) reducing the acidity of any β hydrogen atoms associated with the β carbon. It will be understood that over contributing factors may also enhance the thermal stability of such cathodic compounds.

To determine if the cathodic compounds of the present invention minimize and/or preclude a Hoffman elimination reaction relative to prior art cathodic compounds, 1,1'-dioctyl-4,4'-bipyridinium bis(tetrafluoroborate) (OV) and 1,1'-di[2-(ethyl)hexyl]-4,4'-dipyridinium bis(tetrafluoroborate) (EHV) were placed in EC windows at the same concentration in PC as Experiment No. 1, which underwent thermal stability testing for thousands of hours. At predetermined intervals the percent of mono viologen, as a product generated from the elimination reaction was determined via conventional, analytical HPLC method. The results are provided in Table I below:

| Compound | Temperature (C.) | Time (h) | % Mono Viologen |
|---|---|---|---|
| OV | 85 | 4,000 | 0.69 |
| EHV | 85 | 4,106 | None Detected |
| OV | 105 | 10,022 | 3.70 |
| EHV | 105 | 10052 | 0.61 |
| OV | 125 | 3284 | 4.30 |
| EHV | 125 | 4123 | 0.92 |

As can be seen from Table I supra, the percent of mono viologen formed by OV was substantially more (i.e. between a factor of 5-6) than the that formed by EHV, and thus providing strong evidence that Hoffman elimination occurs with prior art cathodic compounds, including viologens.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic device, comprising:
   a first substantially transparent substrate having an electrically conductive material associated therewith;
   a second substrate having an electrically conductive material associated therewith; and
   an electrochromic medium comprising:
   at least one solvent;
   at least one anodic electroactive material;
   at least one cathodic electroactive material;

wherein at least one of the anodic and cathodic electroactive materials is electrochromic; and
wherein at least one cathodic electroactive material is represented by the following formula:

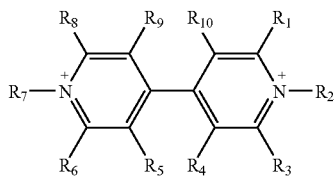

wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s), wherein the carbon atom(s) may be a linking group to, or part of, a halogen, a N, O, and/or S containing moiety, and/or one or more functional groups comprising alcohols, esters, ammonium salts, phosphonium salts, and combinations thereof; with the proviso that $R_2$ and $R_7$ each comprise at least two carbon atoms, at least one of $R_2$ and $R_7$ comprises less than 2 β hydrogen atoms and is void of a benzyl group.

2. An electrochromic medium for use in an electrochromic device, comprising:
at least one solvent;
at least one anodic electroactive material;
at least one cathodic electroactive material;
wherein at least one of the anodic and cathodic electroactive materials is electrochromic; and
wherein at least one cathodic electroactive material is represented by the following formula:

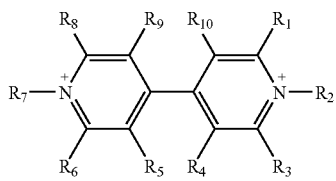

wherein $R_1$-$R_{10}$ are the same or different and comprise H, an alkyl, cycloalkyl, polycycloalkyl, heterocycloalkyl, aryl, alkaryl, aralkyl, alkoxy, alkenyl, and/or alkynyl group containing approximately 1 to approximately 50 carbon atom(s), wherein the carbon atom(s) may be a linking group to, or part of, a halogen, a N, O, and/or S containing moiety, and/or one or more functional groups comprising alcohols, esters, ammonium salts, phosphonium salts, and combinations thereof; with the proviso that $R_2$ and $R_7$ each comprise at least two carbon atoms, at least one of $R_2$ and $R_7$ comprises less than 2 β hydrogen atoms and is void of a benzyl group.

3. The electrochromic medium according to claim 2, wherein at least one of $R_2$ and $R_7$ is void of any β hydrogen atoms.

4. The electrochromic medium according to claim 2, wherein $R_2$ and $R_7$ are void of any β hydrogen atoms.

5. The electrochromic medium according to claim 2, wherein at least one of $R_2$ and $R_7$ comprises an alkyl group containing approximately 5 to approximately 20 carbon atoms.

6. The electrochromic medium according to claim 2, wherein $R_2$ and $R_7$ comprise alkyl groups containing approximately 5 to approximately 20 carbon atoms.

7. The electrochromic medium according to claim 2, wherein at least one of $R_2$ and $R_7$ consists of an alkyl group containing approximately 5 to approximately 20 carbon atoms.

8. The electrochromic medium according to claim 2, wherein $R_2$ and $R_7$ consist of alkyl groups containing approximately 5 to approximately 20 carbon atoms.

9. The electrochromic medium according to claim 2, wherein at least one of $R_2$ and $R_7$ comprises an electron-donating group pending from a β carbon atom.

10. The electrochromic medium according to claim 9, wherein the electron-donating group comprises a hydroxyl group, a straight or branched alkyl group containing 1 to approximately 50 carbon atom(s), alcohols, amines, phosphines, ethers, esters, amides, nitriles, olefins, and combinations thereof.

11. The electrochromic medium according to claim 2, wherein $R_2$ and $R_7$ comprise an electron-donating group pending from a β carbon atom.

12. The electrochromic medium according to claim 11, wherein the electron-donating group comprises a hydroxyl group, a straight or branched alkyl group containing 1 to approximately 50 carbon atom(s), alcohols, amines, phosphines, ethers, esters, amides, nitriles, olefins, and combinations thereof.

13. The electrochromic medium according to claim 2, wherein at least one of $R_2$ and $R_7$ comprises a 2-ethylhexyl group.

14. The electrochromic medium according to claim 2, wherein $R_2$ and $R_7$ comprise 2-ethylhexyl groups.

15. The electrochromic medium according to claim 2, wherein at least one of $R_2$ and $R_7$ comprises a neopentyl group.

16. The electrochromic medium according to claim 2, wherein $R_2$ and $R_7$ comprise neopentyl groups.

17. The electrochromic medium according to claim 2, wherein $R_2$ and $R_7$ consist of 2-ethylhexyl groups.

18. The electrochromic medium according to claim 2, wherein $R_2$ and $R_7$ consist of neopentyl groups.

19. The electrochromic medium according to claim 2, wherein $R_1$-$R_{10}$ are void of a benzyl group.

20. The electrochromic medium according to claim 2, wherein $R_2$ and $R_7$ are void of a benzyl group.

21. An electrochromic device, comprising:
a first substantially transparent substrate having an electrically conductive material associated therewith;
a second substrate having an electrically conductive material associated therewith; and
an electrochromic medium according to claim 20 contained within a chamber positioned between the first and second substrates.

22. The electrochromic medium according to claim 2, wherein the electrochromic medium further comprises at least one of a cross-linked polymer matrix, a free-standing gel, and a substantially non-weeping gel.

23. An electrochromic device, comprising:
at least one substrate having an electrically conductive material associated therewith; and
the electrochromic medium according to claim 2.

24. The electrochromic device according to claim 23, wherein the device comprises an electrochromic window.

25. The electrochromic device according to claim 23, wherein a substrate is coated with a reflective material.

26. The electrochromic device according to claim 24, wherein the device comprises an electrochromic mirror.

27. The electrochromic device according to claim 26, wherein the device comprises a metallic ring around a perimeter thereof.

28. The electrochromic device according to claim 23, wherein a substrate is less than approximately 1.0 mm thick.

29. The electrochromic device according to claim 28, where the device is an aircraft transparency.

30. The electrochromic device according to claim 23, wherein a substrate comprises a hydrophilic coating.

* * * * *